United States Patent [19]

Farello

[11] 4,005,767
[45] Feb. 1, 1977

[54] SLACK ADJUSTER MOUNTED INSIDE A BRAKE CYLINDER

[75] Inventor: Luciano Farello, Turin, Italy

[73] Assignee: WABCO Westinghouse GmbH, Turin, Italy

[22] Filed: Mar. 4, 1976

[21] Appl. No.: 663,676

[30] Foreign Application Priority Data

Mar. 18, 1975 Italy .................................. 67682/75

[52] U.S. Cl. .............................. 188/203; 188/196 D
[51] Int. Cl.[2] ....................................... F16D 65/66
[58] Field of Search ............ 188/71.9, 196 D, 202, 188/203

[56] References Cited

UNITED STATES PATENTS 3,482,662  12/1969  Bruhn et al. .................. 188/196 D
3,645,364  2/1972  Otto et al. ..................... 188/196 D
3,744,596  7/1973  Sander .............................. 188/203

Primary Examiner—George E. A. Halvosa
Attorney, Agent, or Firm—W. F. Poore; R. W. McIntire, Jr.

[57] ABSTRACT

The present invention refers to an automatic slack adjuster to regulate the slack between a rotating disc that is secured to a railroad car axle, and a braking element which is brought into contact with the rotating disc, to brake it. The slack adjuster is inserted in a pneumatic brake cylinder. This brake cylinder includes at least one piston the purpose of which is to move axially when the cylinder is activated, and a driving shaft or piston rod connected with the braking element.

7 Claims, 14 Drawing Figures

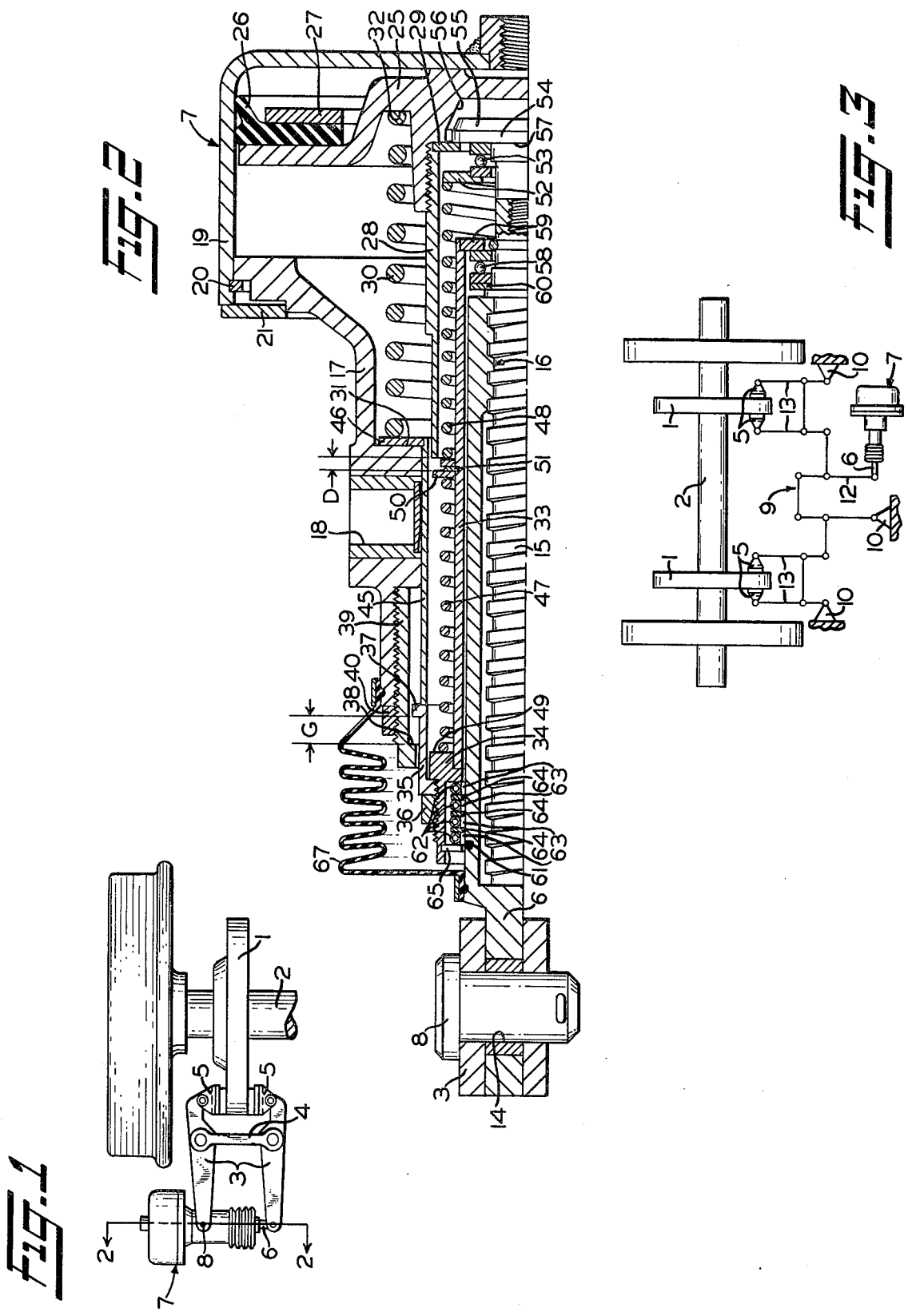

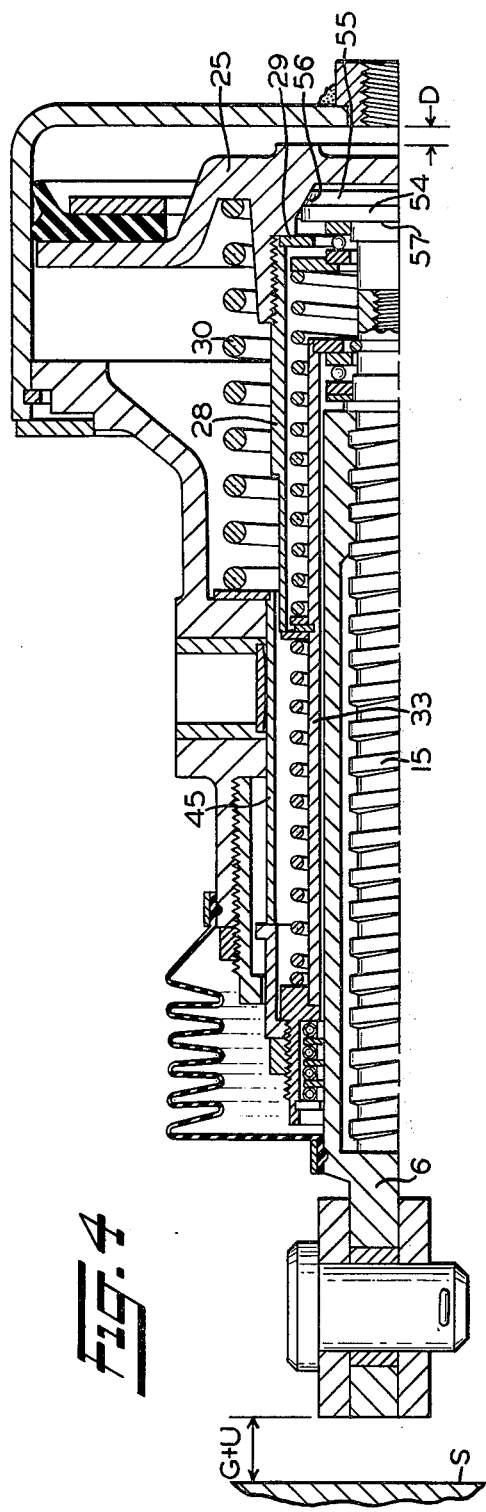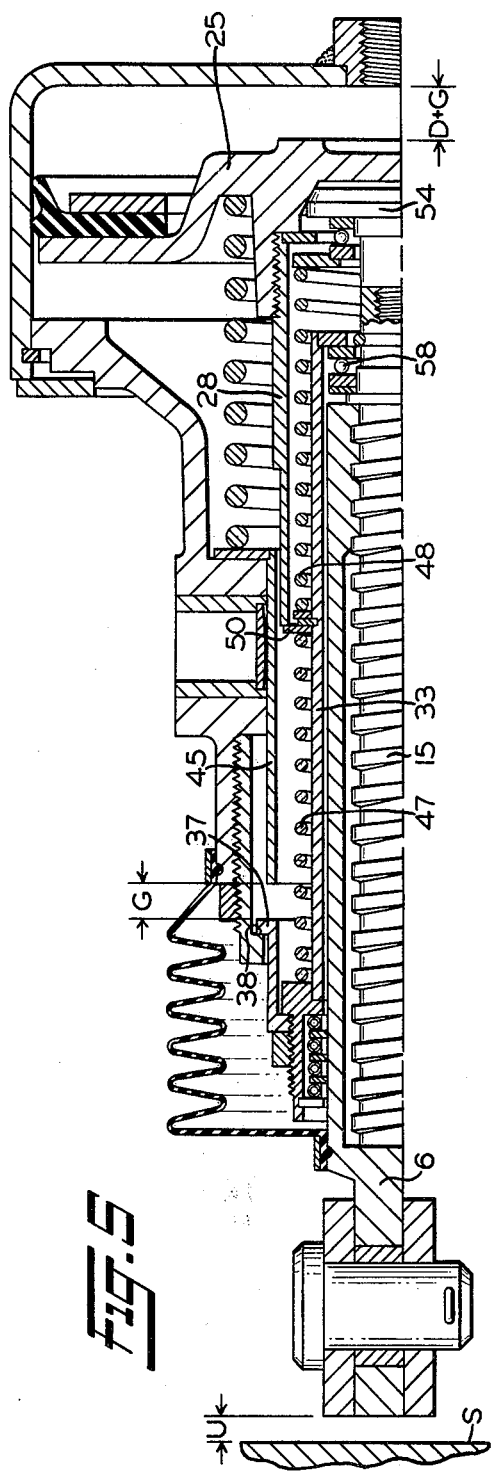

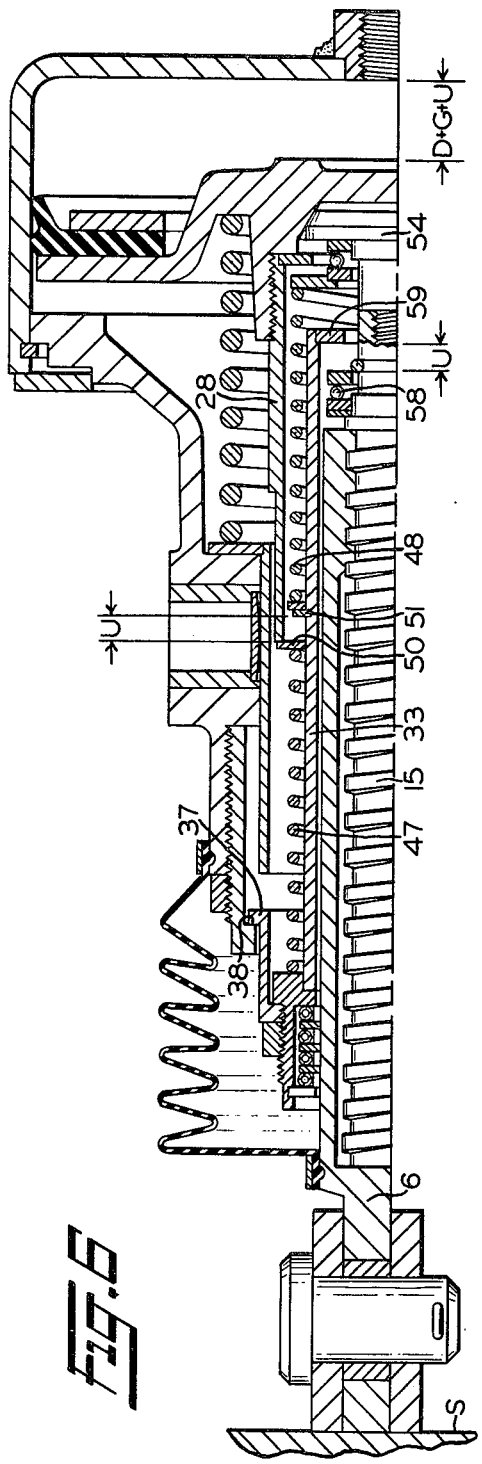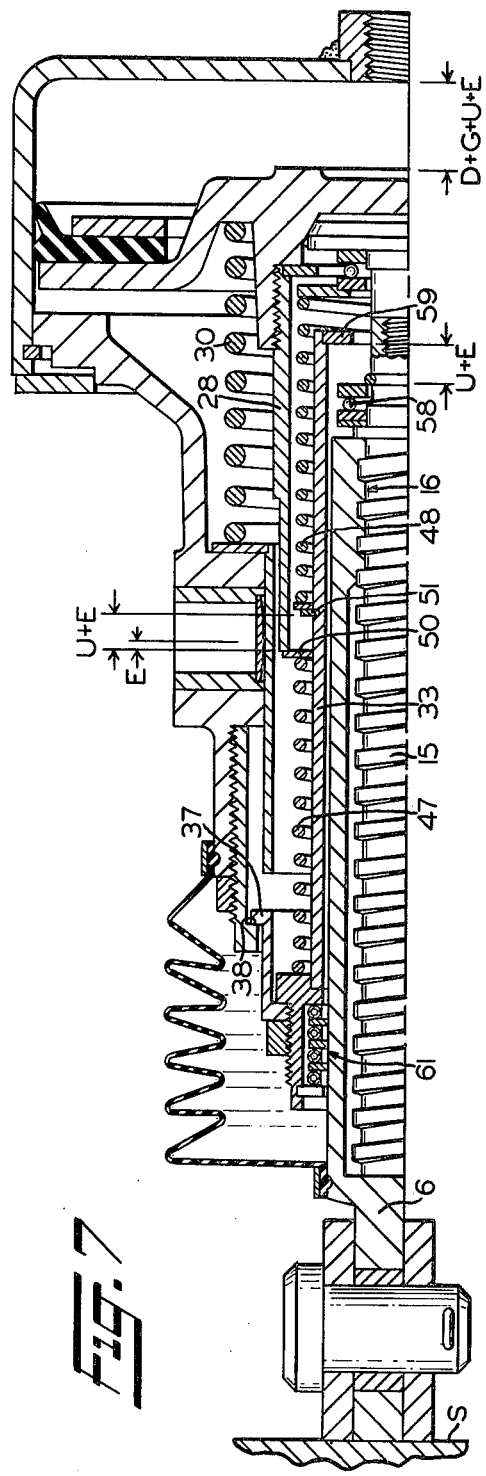

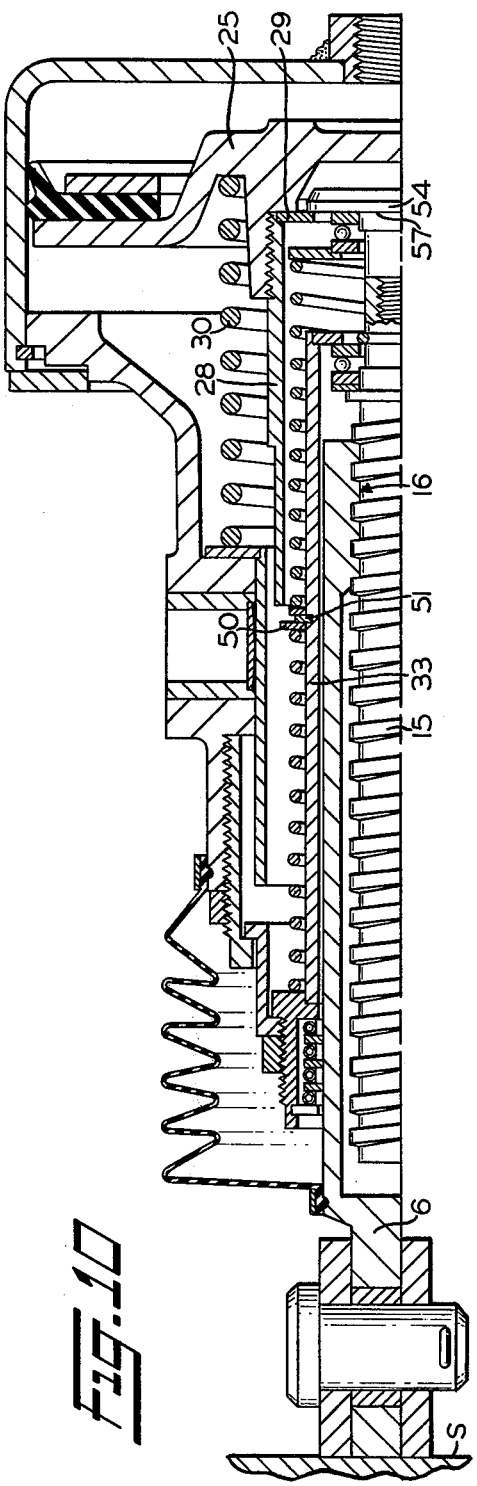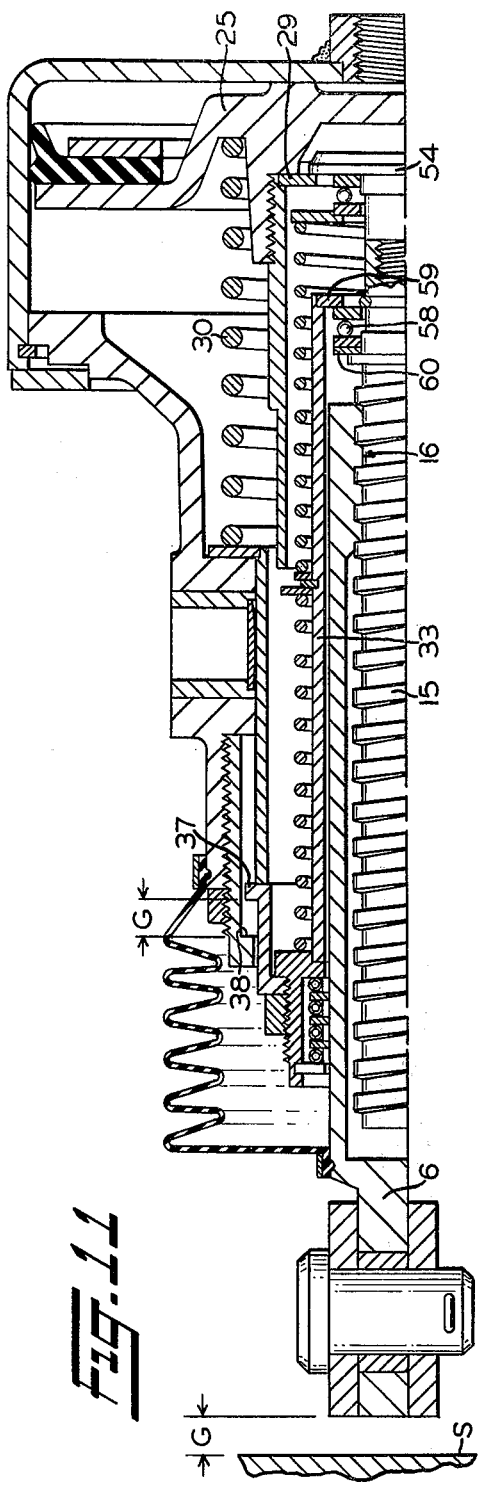

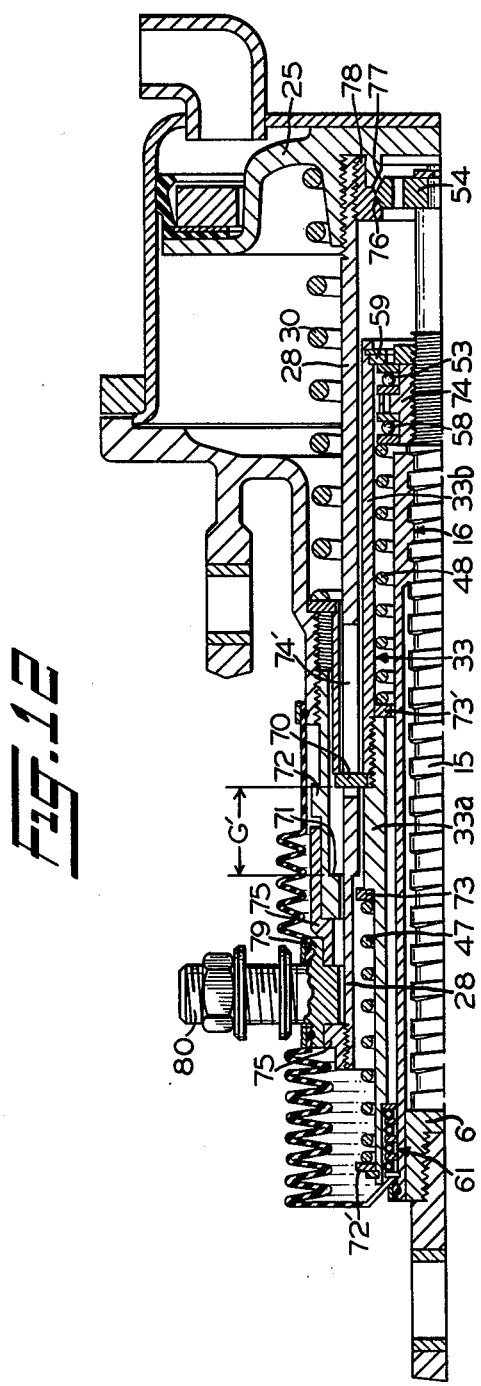

SLACK ADJUSTER MOUNTED INSIDE A BRAKE CYLINDER

SUMMARY OF THE INVENTION

The slack adjuster according to the present invention is characterized by the fact that it includes:

A female screw formed on the inside of the piston rod engages with a threaded shaft that carries at one end thereof a clutch mechanism having a couple of surfaces the purpose of which is to be placed in contact or engage alternately, with corresponding clutch surfaces formed on the piston.

A stopping element is axially displaceable by means of a one-way clutch with respect to said driving shaft or piston rod that has screw-threaded engagement with said threaded shaft. A first stopping means is carried by the brake cylinder to stop the displacement of said stopping element by the piston with respect to the cylinder following a pre-set axial displacement of said stopping element in a first direction. A second stop in the form of a clutch surface carried by the piston is effective to stop the axial displacement of a clutch element carried on said threaded shaft with respect to the stopping element upon movement of the piston in a second direction, opposite the preceding one.

Elastic means is placed between said piston rod and said stopping element, to effect axial displacement of said stopping element in said first direction when said piston rod is displaced in the same direction, and meant to be deformed, elastically, when said stopping element is stopped by the first stopping elements.

Resisting means, placed between said piston rod and said stopping element, is effective to oppose themselves to the axial displacement of the piston rod in the first direction with respect to the stopping element, with an axial force the value of which has been preset. This resisting means enables movement of the piston rod with respect to the stopping element when the piston rod moves in an opposite direction.

For a better understanding of the present invention, there will now be given, as an example only, the description of a few embodiments of the invention.

In the accompanying drawings:

FIG. 1 is a plan view of a fluid-pressure-operated single disc brake assembly operated through a pair of levers by a brake cylinder that embodies therein a slack adjuster mechanism constructed in accordance with a first embodiment of the invention.

FIG. 2 is a vertical cross-sectional view on an enlarged scale, taken along the line 2—2 of FIG. 1 and looking in the direction of the arrows, showing the brake cylinder and slack adjuster mechanism therein in a brake release position.

FIG. 3 is a plan view of a fluid-pressure-operated double disc brake assembly operated through a plurality of levers by a brake cylinder that embodies therein a slack adjuster mechanism constructed in accordance with a second embodiment of the invention.

FIG. 4 is a vertical cross-sectional view showing the piston and slack adjuster mechanism moved to a first position out of the brake release position in a brake applying direction.

FIG. 5 shows the position the piston and slack adjuster mechanism occupy when the brakes are applied without brake shoe wear.

FIG. 6 shows the position the piston and slack adjuster mechanism occupy when the brakes are applied subsequent to brake shoe wear.

FIG. 7 shows the piston moved a short distance E in the direction of the left hand from the position shown in FIG. 6.

FIG. 10 shows the piston moved from the position shown in FIG. 9 to a third position in the brake releasing direction.

FIG. 11 shows the brake cylinder and slack adjuster mechanism in the brake release position subsequent to brake shoe wear.

FIG. 12 is a vertical cross-sectional view of the brake cylinder shown in FIG. 3 and embodying therein a slack adjuster mechanism constructed in accordance with the second embodiment of the invention.

DESCRIPTION

Figure 8:
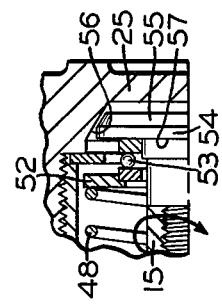
FIG. 8 is a partial view showing the initial movement of the piston in a brake releasing direction subsequent to brake shoe wear.

The automatic slack adjuster of the present invention is suitable to be incorporated in the cylinders or units of braking rigging for railroad vehicles, especially in those for use with disc type brakes, of which there are schematically given two examples in FIGS. 1 and 3. In those arrangements for braking, there are substantially present one or two metal discs 1 (FIGS. 1 and 3) rigidly mounted on an axle 2 of a car of a railroad vehicle. A single disc is shown in FIG. 1, and two such discs are shown in FIG. 3. The above-mentioned braking rigging includes a plurality of levers which, in the case of the arrangement in FIG. 1, are substantially constituted by two levers 3, connected by a connecting rod 4. At one end of each one of the levers 3, there is hinged or pivoted a brake shoe 5 that is forced into contact with the braking surface of disc 1, while the other end of these levers 3 is pivoted respectively to a piston rod 6 of a brake cylinder, indicated by the numeral 7, and to the body of the brake cylinder itself, by means of a pin 8.

In the case of the braking rigging represented in FIG. 3, the plurality of levers inserted between the brake cylinder 7 and the brake shoes 5, includes several levers, generally indicated by the numeral 9, which are pivoted to one another and to fixed parts such as the truck frame 10, according to an arrangement which is known in itself. The end of a first lever 12 of this plurality of levers is pivoted to the piston rod 6 of the brake cylinder 7, and it is meant to give, as a result of its axial translation, a rocking motion to the end levers 13 to force the corresponding brake shoes 5 into contact with discs 1.

The slack adjuster according to the present invention has as its object to maintain, when the brake cylinder is in its resting or de-activated position, the braking face of each one of the brake shoes 5 (that is to say the one meant to come in contact with the lateral surface of the corresponding disc) in a correct position at a preset distance from the surface itself, such distance shall, in the following, be defined as the normal brake shoe clearance. Therefore, the slack adjuster has as its purpose to maintain substantially constant the value of the brake shoe clearance which would tend, without such slack adjuster to increase with use, more and more, causing the wear of the shoes.

The slack adjuster according to the first embodiment of the invention shown in FIG. 2, substantially includes a piston rod 6, one end of which is provided with a bore 14 meant to be connected by a pivot pin with one of the levers of the brake rigging, in the manner indicated in FIGS. 1 and 3.

Piston rod 6 is partially hollow, so as to permit the lodging, in its inside, of a shaft 15 provided with an external non-self-locking screw thread which engages with a corresponding female non-self-locking screw thread 16 formed inside of piston rod 6. Part of the piston rod 6 and of the corresponding screw threaded shaft 15 are partially lodged inside a non-pressure head 17 of the brake cylinder 7. This non-pressure head 17 is substantially tubular in shape, and it is provided with a couple of diametrically opposed bores 18, which are meant to enable the brake cylinder to be hinged by pins 8 to levers 3 (FIG. 1). A brake cylinder body 19 is connected to the non-pressure head 17 by means of a snap ring 20 and a stopping ring 21 connected to non-pressure head 17 by means of screws (not shown). A piston 25 is slidably mounted in brake cylinder 19 and is fitted with a packing cup 26 affixed to the piston itself in any manner, for example by means of a stopping ring 27. The central part of the piston 25 is, in its turn, affixed, for example, by means of a threaded connection, to a sleeve 28. A stopping clutch element or sleeve 35 is held fixed with respect to a sleeve 34 by means of a shoulder above same and by means of a threaded metal nut 36. The stopping clutch element or sleeve 35 is fitted with an outturned flange or ring-shaped projection 37 which is adapted to abut against a corresponding shoulder 38 formed on another sleeve 39 which is fixed, by means of a threaded coupling, and with the help of a metal lock nut 40, on non-pressure head 17 of the brake cylinder 7. In the brake release position represented in FIG. 2, the stopping clutch element 35 abuts the end edge of a sleeve 45 the other end of which is secured to a supporting ring 46 which is inserted between one end of spring 30 and a shoulder 31 on the non-pressure head 17. Spring 30 is disposed between ring 46 and a shoulder 32 on piston 25.

Between sleeve 45, sleeve 28 and a tubular element 33 that abuts sleeve 34, there are placed two springs 47 and 48, substantially of the same diameter. The first one of these springs 47 has one end which rests on a shoulder 49 on sleeve 34. The other end rests on a ring 50 which in turn is in contact with a ring-shaped projection 51 (in this case a snap ring) carried by the tubular element 33. The second spring 48 has one of its ends resting on the above-mentioned ring-shaped projection 51, and its other end resting on a ring 52 that abuts a thrust bearing 53 which in its turn is in contact with a clutch head 54, carried on the threaded shaft 15. This clutch head 54 has formed thereon a first clutch face or surface, substantially cone-shaped, 55, meant to be coupled with a corresponding clutch face or surface 56, also cone-shaped, formed on the inside of the piston 25. A second face or surface 57, substantially plane, on clutch head 54 is biased by spring 30 against a stop ring 29 carried by piston 25. Between the clutch surfaces 55 and 56 or between the stop surface 57 and the corresponding surface on ring 29, there is present a certain play so that, depending on the relative position which clutch head 54 has with respect to piston 25, only one pair of such clutch surfaces is in contact at any one time.

A second thrust bearing 58 is inserted between a stopping ring 59 that is secured to one of the ends of the tubular element 33, and another ring 60 which rests against a corresponding shoulder on the threaded shaft 15.

In sleeve 34, there are placed resisting means in the form of friction clutch members, indicated as a group by the numeral 61, the purpose of which is to oppose themselves to the axial displacement of the piston rod 6 with respect to the tubular element 33. Such resisting means may include, for example, spring and ring 62 each one of which is prewound so as to generate radial pressures on a corresponding cleaved or split ring 63 the purpose of which is to transmit in a uniform manner the above-mentioned radial pressures from each one of the springs 62 to the surface of piston rod 6. Between the various springs 62 there are placed spacer rings 64 and such rings and springs are axially fixed with respect to sleeve 34, by means of an elastic or snap ring 65.

Conveniently, a bellows 67 of the usual type, one end of which is affixed to non-pressure head 17 of the brake cylinder 7 and the other to the piston rod 6, is meant to prevent the infiltration of foreign substances such as dust and dirt into the various parts of the slack adjuster which have been described.

OPERATION

The operation of the automatic slack adjuster occurs in the following manner. This operation is now described with reference to FIGS. 4 to 12, which represent the various positions of the elements of the brake cylinder 7, equipped with the automatic slack adjuster constructed according to the first embodiment of the present invention, represented in FIG. 2, and described above. It is assumed that such slack adjuster is connected through a plurality of levers to brake shoes 5 which are to be moved into contact with a disc 1 of a braking device of the disc type, as represented in FIG. 1. It is further assumed that, in the brake release position of the slack adjuster which corresponds to that in FIG. 2, between shoes 5 (FIG. 1) and the corresponding surfaces of disc 1, there exists, in addition to the normal brake shoe clearance or theoretical play which hereafter is indicated by G, a play resulting from wear of the shoes, indicated by U, which the slack adjuster is supposed to take up or to cancel during one of its cycles of operation. This take-up of slack will now be described. For the sake of simplicity of the description, in FIGS. 4 to 12 there has been indicated by S a braking surface which is located at the distance G plus U from the end of piston rod 6. It may then be assumed, without removing anything from the generality of the description which follows, that the condition which corresponds to the contact of the end of the above-mentioned piston rod 6 with surface S, corresponds to the condition of contact between brake shoes 5 (FIG. 1) and the corresponding flat braking surfaces on disc 1. Therefore, when in the description there will be mentioned the distance between the end of piston rod 6 and surface S, there must be understood that such distance is, in reality, that between the braking surface of the brake shoes 5 and the corresponding braking surfaces on disc 1.

In the brake release position of the slack adjuster device, piston 25 is pressed against the corresponding wall of the bottom of brake cylinder body 19 (FIG. 2), under the action of spring 30 which is in pre-compression. In the above-mentioned position, ring 29, acting on surface 57 on clutch head 54 secured to the threaded shaft 15, holds this shaft 15 in the release position to the right, as represented in FIG. 2. Moreover, because ring 60 abuts a shoulder on threaded shaft 15 and thrust bearing 58 is disposed between ring 60 and ring 59 which is secured to the right-hand end of tubular element 33, the tubular element 33 comes to be held by springs 47 and 48 in a position such that the ring-shaped outturned flange 37 is substantially in contact with the corresponding end of the sleeve 45. Then the distance between outturned flange 37 and shoulder 38 is equal to G, the theoretical play or normal brake shoe clearance, which the slack adjuster is supposed to re-establish at the end of its operating cycle. The value of the above-mentioned play or normal brake shoe clearance may, of course, be set on the slack adjuster by adjusting sleeve 39 and the corresponding lock nut 40. Finally, the edge of the end of the sleeve 28 that is secured to piston 25 finds itself biased by spring 30 at a preset distance from ring 50, distance D.

Let it now be assumed that compressed air is sent into cylinder 7, to displace piston 25, toward the left in FIG. 2. At the end of piston 25 moving a first distance equal to D (FIG. 5) the edge of the left end of sleeve 28 comes into contact with ring 50 and, at the same time, there occurs the separation of surface 57 on clutch head 54 from the corresponding ring 29 carried by piston 25, while the cone-shaped surface 55 comes in contact with the corresponding cone-shaped surface 56 on the piston itself. Consequently, the displacement of the piston 25 toward the left, at the end of the next successive movement, is equal to G (FIG. 5). Because of the contact between clutch head 54 and piston 25, the threaded shaft 15 is displaced the same distance toward the left in FIG. 5. Moreover, because of the contact between sleeve 28 and ring 50, the same (very) displacement G is imposed on spring 47, which it can be assumed, during such displacement remains substantially undeformable, through which such displacement is also imposed on tubular element 33 and to those parts secured to it, which will bring outturned flange 37 into contact with shoulder 38, as clearly represented in FIG. 5.

In the next successive movement of the piston 25 to the left, equal to U (FIG. 6) which represents brake shoe wear, there is imposed on clutch head 54 and therefore on the threaded shaft 15, this same displacement U, while tubular element 33 and the parts associated with it remain substantially stationary, because of the stopping achieved by means of outturned flange 37, abutting the corresponding shoulder 38. It follows that ring 59 at the right-hand end of tubular element 33 remaining substantially fixed and thrust bearing 58 separates itself from this ring 59, as clearly shown in FIG. 6. The same displacement U is imposed on (imparted to) ring 50 by sleeve 28, through which this ring 50 becomes separated from the corresponding snap ring 51, and spring 47 is thus compressed.

It is therefore obvious that in this phase the piston rod 6 has shifted, from its initial position, a distance equal to D + G + U, and therefore its left-hand end is substantially in contact with the reference surface S. To such a condition there corresponds, physically, the contact between the braking surface of the shoes 5 and the corresponding surfaces on disc 1.

In a successive small (short) movement E (FIG. 7) of piston 25, the springs 47 and 48 are simply elastically deformed since all of the parts of the kinematic chain which connect the piston rod 6 to brake shoes 5 are rigid members. During such a phase there must therefore be imagined that there is no variation of the relative position between the end of the piston rod 6 and the corresponding surface of reference S, while there is obviously increased by E the distance between ring 50 and the corresponding snap ring 51, and between the thrust bearing 58 and the corresponding ring 59. The phase shown in FIG. 7 corresponds to that of the braking action, in which shoes 5 apply on the corresponding surfaces of disc 1 pressures to generate tangential forces of friction.

In effecting a brake release, starting with the parts shown in FIG. 7, there begins the discharge of the air (compressed air) from the brake cylinder 7, whereupon the piston 25, under the action of spring 30, is moved toward the right. During a first part of such a brake release, piston 25 and sleeve 28 move toward the right a distance equal to E. Therefore, the elements of the slack adjuster are substantially restored to the same positions and conditions which existed as shown in FIG. 6. Continuing the displacement of the piston 25 and sleeve 28 toward the right by spring 30, there is caused the separation of surface 56 on piston 25 (FIG. 8) from the corresponding cone-shaped clutch surface 55 on clutch head 54, as represented in the detail of FIG. 8. In fact, the threaded shaft 15 tends to be held back in the position in which it is shown in FIG. 7, either because of the friction between the threaded part of the shaft itself and the corresponding female screw 16, or because of the resistance opposed by the resisting means in the form of friction clutch members 61 (FIG. 7) which tend to prevent the displacement of the shaft piston rod 6 with respect to tubular element 33.

Figure 9:
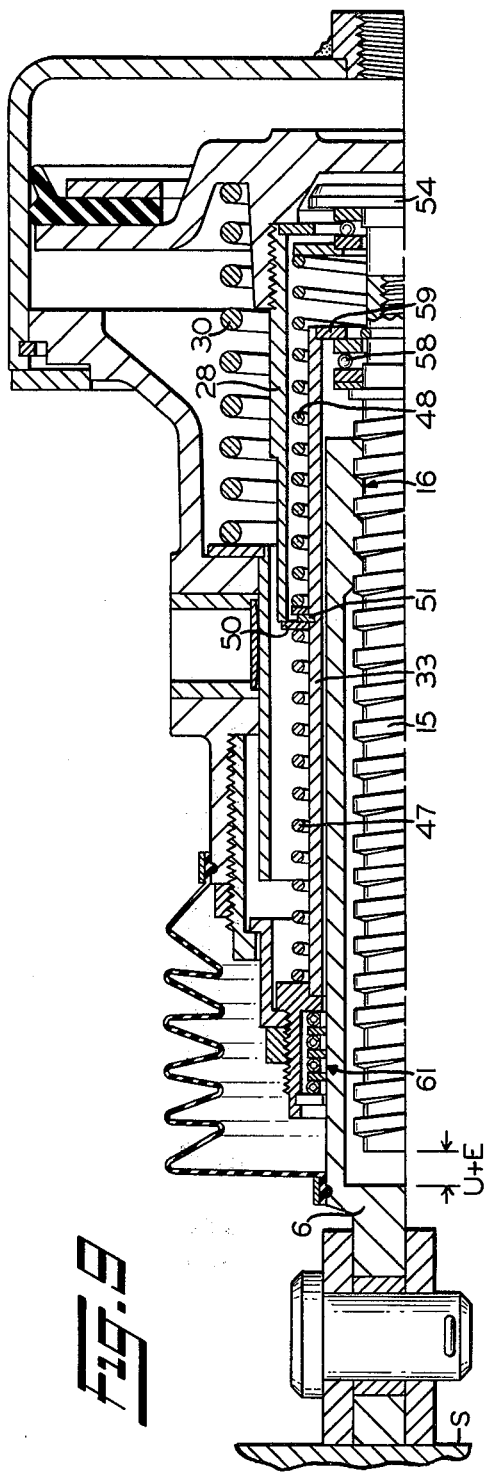
FIG. 9 shows the piston and slack adjuster screw-threaded rod moved in a brake releasing direction relative to the piston rod a distance equal to brake shoe wear.

Immediately following the separation of the above-mentioned cone-shaped surfaces 55 and 56, springs 47 and 48 which are, as a result of what has been said, in compression, exert axial forces in opposite direction. The one 47 directed toward the left tends to maintain the contact between the outturned flange 37 and the corresponding shoulder 38 (FIG. 7) and the one 48 directed toward the right acting on ring 52 (FIG. 8) applies to thrust bearing 53 an axial force which is capable of effecting relative rotation between threaded shaft 15 and the female screw 16, and therefore a corresponding relative axial shifting of shaft 15 the distance U, as represented in FIG. 9. Such rotation and axial displacement, that is relative axial displacement of shaft 15 relative to tubular element 33, are the result of the fact that to clutch head 54 that is secured to the above-mentioned threaded shaft 15 there is applied by spring 48 an axial force directed toward the right in FIGS. 8 and 9, while the female screw 16 is prevented from moving in the same direction by the action of the friction force which is applied to the driving shaft 6 by resisting means in the form of friction clutch members 61. Rotation and relative axial displacement of shaft 15 have ended when the thrust bearing 58 (FIG. 9) stops on the corresponding stopping ring 59, as represented in FIG. 9. At the end of such spinning and shifting of shaft 15 ring 50 is also biased into contact with the snap ring 51 by spring 47. It is obvious therefore that upon the parts reaching the position shown in FIG. 9 there has occurred a relative axial displacement between threaded shaft 15 and female screw 16, equal to brake shoe wear indicated by distance U which wear is compensated for during the above described cycle of operation of the slack adjuster.

Next follows the displacement farther toward the right of the piston 25, under the action of spring 30, and ring 29 (FIG. 9) is moved in contact with surface 57 on clutch head 54, as represented in FIG. 10. Finally, in the remaining part of the shifting of piston 25, equal to distance G, because of the contact between ring 29 and head 54 (FIG. 10), the threaded shaft 15 and the female screw 16 coupled with it are moved the same distance so as to separate the end of the piston rod 6 from the corresponding reference surface S, by the above-mentioned (distance G), as clearly represented in FIG. 11. There is also evident that, at the end of such movement to the right, tubular element 33 is also axially moved toward the right by the same quantity G, because of the connection existing between ring 60, thrust bearing 58 and ring 59. Consequently, outturned flange 37 finds itself displaced from the corresponding shoulder 38, by distance G and therefore the various parts of the slack adjuster find themselves in the same relative position which they occupied in the brake release condition shown in FIG. 2, prior to the beginning of the operating cycle.

In the second embodiment of the slack adjuster device, which is represented in FIG. 12, there have been indicated by the same reference numbers those elements which correspond to those in the preceding or first embodiment of the invention. There are only a few small variations in structure which will now be described. Tubular element 33 is, in this case, made up of two parts 33a and 33b, joined together by means of a threaded coupling placed approximately in the middle part of the element itself, in a manner such as to constitute a shoulder, with several radially projecting fingers 70 extending therefrom, the function of which fingers, in the operation of the slack adjuster, is similar to that performed by outturned flange 37 in the preceding embodiment of the invention. In fact, such projecting fingers 70 serve to abut or stop against a shoulder 71 provided in a threaded metal sleeve 72, similar to the threaded metal sleeve 39 of the preceding embodiment of the invention. Spring 47 is now placed externally to the tubular element 33, while spring 48 is placed internally to same. The first one 47 of these springs abuts at one end a stopping ring 72', which is in all things corresponding to shoulder 49 in the first embodiment of the invention, and at the other end, abuts a ring or spring seat 73 which abuts part 33a. The second one (spring 48) is placed between the shoulder ring or spring seat 73' and a sleeve 74 provided with a couple of shoulders against which abut thrust bearings 58 and 53, which have a function similar to those indicated by the same reference numerals in the first embodiment of the invention. Spring 48 still transmits to the threaded shaft 15, through bearing 58, the force generated by this spring and tubular element 33 still is capable of applying an axial force toward the left to said shaft 15, through the press fit formed by ring 59, thrust bearing 53 and sleeve 74.

Sleeve 28 which is secured to piston 25 as in the first embodiment of the invention is slightly modified, being longer than in the preceding case. Furthermore, it is provided with a stopping ring 75 at the left-hand end which is connected to this sleeve 28 by means of a threaded connection. Moreover, this sleeve 28 is provided with elongated slots 74' to permit passage through same of the radially projecting fingers 70. Also, clutch head 54 that is secured to the threaded shaft 15 is provided with a couple of cone-shaped clutch surfaces 76, 77, the function of which is in everything similar to that of the couple of surfaces 57 and 55 in the first embodiment of the invention. These clutch surfaces 76, 77 are meant to come in contact with corresponding surfaces on a sleeve 78 built in two parts, connected by means of a threaded coupling to sleeve 28, and in everything corresponding to a surface on ring 29, and to the cone-shaped surface 56 in the first embodiment of the invention.

This second embodiment of the invention now described presents, in addition, a ring 79 fitted with a couple of opposite pins 80, only one of which is shown, which are meant to be connected to a forked part (not represented), such as a hand brake, or to any other driving element movable axially to displace fingers 70, so as to manually apply the braking rigging controlled by the herein described brake cylinder, an operation which was not possible with the first embodiment of the invention. Indeed, displacing pins 80 toward the left in FIG. 12, because of the presence of the stopping ring 75, causes sleeve 28 to be displaced in the same direction, which sleeve 28, in its turn, through the unclutching of cone-shaped clutch surface 76 on clutch head 54 from the sleeve 78 and the movement of the cone-shaped surface on the sleeve 78 in the same direction into clutching contact with the clutch surface 77 thereafter causes movement in the direction of the left hand of threaded shaft 15, and therefore the piston rod 6.

The adjusting of the theoretical play or normal brake shoe clearance G is done, in this case, by adjusting the relative axial position of shoulder 71 on sleeve 72, with respect to the radial fingers 70.

With respect to the general functioning of the slack adjuster of this second embodiment of the invention, it is in everything similar to the first embodiment, there occuring during movement to the various positions only a few obvious variations resulting from the different structure of some of the elements of the slack adjuster itself.

The slack adjusters described make it possible, also then, to have a rapid and easy replacement of the shoes, necessary when the wear of same has exceeded a preset limit value. When such conditions are reached, it is evident that in the brake release condition of the slack adjuster devices seen in FIGS. 2 and 12, the relative position between female screw threads 16 and the externally threaded shaft 15 is the one in which the female screw thread 16 engages the extreme part toward the left of the thread on shaft 15 itself. Therefore, when there takes place the repalcement of the shoes, it is also necessary to perform a rotation and, therefore, a resulting relative translation between the threaded shaft 15 and the female screw, sufficient to cause the second one to become coupled with a part of the shaft which is in the right hand position, as seen in FIG. 2. In order to obtain such a relative rotation, it is sufficient to thrust the piston rod 6 toward the right in FIG. 2, so as to separate, first, surface 57 on clutch head 54 from ring 29. Continuing to apply the thrust under those conditions, there is generated by spring 30, between threaded shaft and female screw, an axial force which results in screwing the one with respect to the other. Indeed, as clearly visible in the diagram in FIG. 2, the thrust applied to the piston rod 6 is transmitted, through thrust bearing 58, to the tubular element 33, and the latter being in contact with spacer piece 45, the thrust itself is transmitted to spring 30, which reacts with a force in the opposite direction, the purpose of which is to cause the above-mentioned unscrewing. This is also helped by the presence of thrust bearing 58, the function of which is not to interfere during the phases of operation of the slack adjuster which have first been described, but only in this phase of setting back to zero of the slack adjuster itself for the replacement of brake shoes.

Figure 14:
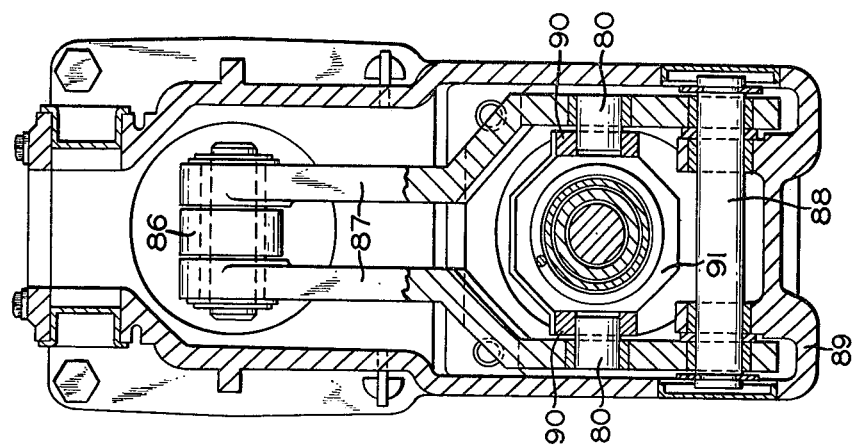
FIG. 14 is a vertical cross-sectional view, taken along the line 14—14 of FIG. 13 and looking in the direction of the arrows, showing further structural details of the slack adjuster mechanism.
Figure 13:
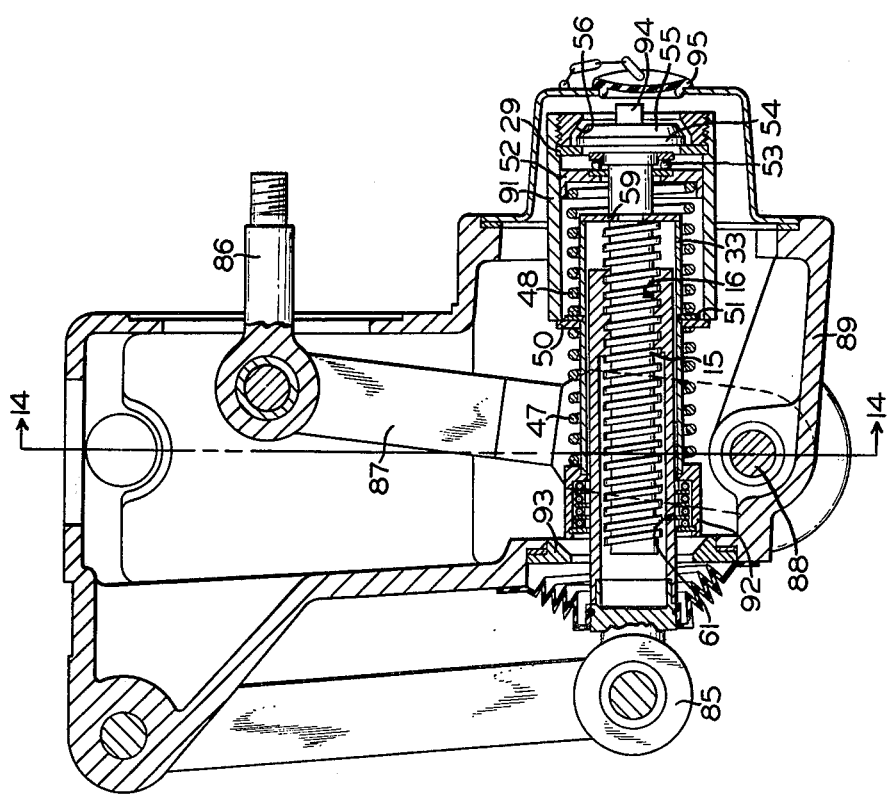
FIG. 13 is a vertical cross-sectional view of a tread brake unit embodying a slack adjuster mechanism constituting a third embodiment of the invention.

The slack adjuster described can also be used in a braking unit of the type of the one represented in FIGS. 13 and 14. Such a unit includes a brake rod 85 similar to piston rod 6 in the preceding embodiments of the invention, which brake rod 85, generally, is directly connected to the brake shoe (not shown) which must be operated. The above-mentioned unit can be operated, for example, by a pneumatic cylinder (not represented) by means of a small connecting rod 86 which is connected to a couple of levers 87 which are hinged (articulated), by means of a pin 88, to the frame of the unit. The two levers 87 are articulated, by means of pins 80 (FIG. 14) to bearings 90 which are carried in a sleeve 91 inside of which there is located a slack adjuster which substantially corresponds to the one shown in FIG. 2. Therefore, it must be assumed that, in this unit, sleeve 91 has the same function as piston 25 of the brake cylinder 7 shown in FIG. 2. In this embodiment of the invention the braking unit substantially works as a multiplier of the braking force, since at a preset force applied to the small connecting rod 86, a much greater force is applied to the brake rod 85. The degree of this force depends on the ratio between the arms of lever 87 which extend between the articulation points.

In FIG. 13 there have been indicated by the same reference number those parts which are substantially the same as those in the first embodiment of the invention shown in FIG. 2. Especially, it must be noticed that the functions explained, in connection with the structure shown in FIG. 2, for the outturned flange 37 and for the corresponding shoulder 38, are performed in this case by a sleeve 92 and by a ring 93 carried by the casing 89. There is, however, no bearing such as the bearing 58 shown in FIG. 2, since the operation of setting back to zero of the slack adjuster for the replacement of shoes, is not done in the same manner as described for the first and second embodiments of the invention. In fact, in this case, to determine the rotation, and therefore the axial translation between the female screw-threaded member 16 and externally screw-threaded shaft 15, the latter is made to rotate by applying force to the end 94 of a hex head pin integral with shaft 15 which is accessible after there has been removed a small cover 95.

It is evident that it is possible to bring modifications and variations to the described embodiments of the slack adjuster constituting the present invention without leaving the scope of the present invention.

Having now described the invention what I claim as new and desire to secure by Letters Patents, is:

1. A slack adjuster mechanism for a brake cylinder having a piston provided with an internal clutch face and a stop surface spaced apart from said clutch face on the piston, and a hollow piston rod that has therein internal non-self-locking screw threads, said slack adjuster mechanism comprising:
   a. an external non-self-locking screw-threaded rod having thereon respectively an external clutch face and a stop surface spaced apart from said clutch face on said threaded rod for respective cooperation with the internal clutch face and stop surface on the piston,
   b. a pair of spaced-apart stops carried by the brake cylinder,
   c. a stopping element carried by a stopping means and movable responsive to movement of the piston from engagement with one of said stops into engagement with the other of said stops,
   d. seating means carried by said stopping means,
   e. a pair of resilient biasing means interposed respectively between said stopping element and said seating means and between said externally threaded rod and said seating means enabling axial displacement of said stopping element by said piston upon movement thereof in said one direction, one of said resilient biasing means being compressed responsive to movement in said one direction of said piston subsequent to engagement of said stopping element with one of said pair of stops, and the other of said resilient biasing means being effective upon movement of said piston in a direction opposite said one direction, subsequent to movement in said one direction greater than the distance between said spaced-apart stops, to cause rotation of said externally threaded rod relative to said hollow internally threaded piston rod to increase the effective length of said piston rod an amount equal to said movement in said one direction of said piston subsequent to engagement of said stopping means with said one stop, and
   f. resisting means connecting said stopping element and said hollow piston rod enabling movement of said piston rod by said piston in said one direction relative to said stopping element subsequent to engagement of said stopping element with said one stop and effective to maintain said stopping element and said piston rod stationary upon movement of said piston in said direction opposite said one direction until said rotation of said externally threaded rod relative to said piston rod increases the effective length of said piston rod said amount.

2. A slack adjuster mechanism, as recited in claim 1, further characterized by a spring interposed between the piston and the cylinder, said spring being effective to bias the piston in said direction opposite said one direction.

3. A slack adjuster mechanism, as recited in claim 1, further characterized by a thrust bearing so disposed as to abut said stop surface on said screw-threaded rod, and in that said pair of resilient biasing means comprise;
   a. a first spring interposed between said stopping element and said seating means, and
   b. a second spring interposed between said thrust bearing and said seating means for constantly biasing said thrust bearing into abutting contact with said stop surface on said screw-threaded rod whereby second spring is effective, via said thrust bearing, to cause simultaneous rotation and shifting of said screw-threaded rod relative to said piston rod to increase the effective length of said piston rod.

4. A slack adjuster mechanism, as recited in claim 1, further characterized in that said stopping means comprises a first sleeve having at one end an outturned flange movable into engagement with either of said pair of spaced-apart stops upon a preselected degree of movement out of engagement with the other stop.

5. A slack adjuster mechanism, as recited in claim 4, further characterized in that said stopping means comprises a second sleeve concentrically arranged with respect to said first sleeve and rigidly secured thereto for movement therewith, said second sleeve having integral therewith at one end thereof an inturned flange, and by a thrust bearing so carried on said threaded rod as to enable one of said resilient biasing means to transmit force to said threaded rod via said second sleeve and inturned flange to cause simultaneous rotation and shifting of said threaded rod relative to said piston rod to increase the effective length of said piston rod.

6. A slack adjuster mechanism, as recited in claim 5, further characterized in that said resisting means comprises a friction clutch selectively secured to either the hollow piston rod or said stopping element and effective to transmit a fixed gripping force to the other whereby shifting of either effects shifting of the other so long as the resistance to shifting of the other does not exceed the force transmitted thereto.

7. A slack adjuster mechanism, as recited in claim 5, further characterized in that said second sleeve is provided intermediate its ends with an outturned flange, and in that said seating means comprises an annular member so disposed about said second sleeve on one side of said outturned flange as to be shifted relative to said second sleeve upon shifting of the piston in one direction in excess of a chosen amount, said one resilient biasing means being interposed between said annular member and said concentrically arranged sleeves whereby said one resilient biasing means is effective to shift the piston in said direction opposite said one direction.

* * * * *